US011128719B2

(12) United States Patent
Kodaypak et al.

(10) Patent No.: US 11,128,719 B2
(45) Date of Patent: *Sep. 21, 2021

(54) MASTER SERVICE ORCHESTRATION OF VIRTUAL NETWORKING FUNCTIONS

(71) Applicant: AT&T Intellectual Property I, L.P., Atlanta, GA (US)

(72) Inventors: Rajendra Prasad Kodaypak, Sammamish, WA (US); Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 58 days.

This patent is subject to a terminal disclaimer.

(21) Appl. No.: 16/396,936

(22) Filed: Apr. 29, 2019

(65) Prior Publication Data
US 2019/0253501 A1 Aug. 15, 2019

Related U.S. Application Data

(63) Continuation of application No. 14/941,845, filed on Nov. 16, 2015, now Pat. No. 10,277,687.

(51) Int. Cl.
*H04L 29/08* (2006.01)
*H04W 24/02* (2009.01)
(Continued)

(52) U.S. Cl.
CPC ......... *H04L 67/16* (2013.01); *H04L 12/1407* (2013.01); *H04L 41/5051* (2013.01);
(Continued)

(58) Field of Classification Search
CPC . H04L 67/16; H04L 12/1407; H04L 41/5051; H04L 41/5054; H04L 67/10; H04W 24/02; H04W 40/248; H04W 48/17
See application file for complete search history.

(56) References Cited

U.S. PATENT DOCUMENTS 9,537,775 B2 1/2017 McMurry
9,621,362 B2* 4/2017 Livanos ............... H04M 15/66
(Continued)

FOREIGN PATENT DOCUMENTS

WO WO 2015/039512 3/2015
WO WO 2015/058626 4/2015
(Continued)

OTHER PUBLICATIONS

Martins et al., "ClickOS and the Art of Network Function Virtualization," Proceedings of the 11th USENIX Symposium on Networked Systems Design and Implementation (NSDI '14), Apr. 2-4, 2014, pp. 459-473, USENIX Association.
(Continued)

*Primary Examiner* — Esther B. Henderson
*Assistant Examiner* — Nazia Naoreen
(74) *Attorney, Agent, or Firm* — Hartman & Citrin LLC

(57) ABSTRACT

Concepts and technologies disclosed herein are directed to master service orchestration of virtual network functions ("VNFs"). According to one aspect of the concepts and technologies disclosed herein, a network functions virtualization ("NFV") platform includes a hardware resources layer including a plurality of hardware resources, a plurality of VNF resource pools, a plurality of service controllers corresponding to the plurality of VNF resource pools, and a master service orchestrator. The master service orchestrator can, when executed by at least a portion of the plurality of hardware resources, causes the master service orchestrator to perform operations. In particular, the master service orchestrator can receive, from a user equipment ("UE"), a service request. The master service orchestrator also can instruct a service controller of the plurality of service controllers to perform service controller-specific operations
(Continued)

to provide, at least in part, a service included within the service request received from the UE.

20 Claims, 6 Drawing Sheets

(51) Int. Cl.
*H04L 12/24* (2006.01)
*H04W 48/00* (2009.01)
*H04L 12/14* (2006.01)
*H04W 40/24* (2009.01)
*H04W 88/16* (2009.01)

(52) U.S. Cl.
CPC .......... *H04L 41/5054* (2013.01); *H04L 67/10* (2013.01); *H04W 24/02* (2013.01); *H04W 40/248* (2013.01); *H04W 48/17* (2013.01); *H04L 41/5096* (2013.01); *H04W 88/16* (2013.01)

(56) References Cited

U.S. PATENT DOCUMENTS

| | | | |
|---|---|---|---|
| 9,729,396 B2 | 8/2017 | Rosa de Sousa Teixeira | |
| 2014/0317261 A1 | 10/2014 | Shatzkamer et al. | |
| 2014/0317293 A1 | 10/2014 | Shatzkamer | |
| 2015/0063166 A1* | 3/2015 | Sif | G06F 9/45558 370/254 |
| 2015/0207699 A1 | 7/2015 | Fargano et al. | |
| 2016/0353268 A1* | 12/2016 | Senarath | H04W 4/24 |

FOREIGN PATENT DOCUMENTS

| | | |
|---|---|---|
| WO | WO 2015/094197 | 6/2015 |
| WO | WO 2015/126430 | 8/2015 |
| WO | WO 2015/131696 | 9/2015 |
| WO | 2015165513 | 11/2015 |
| WO | 2016102297 | 6/2016 |

OTHER PUBLICATIONS

Wolfgang et al., "Research Directions in Network Service Chaining," Future Networks and Services (SDN4FNS), 2013, IEEE.
Mehraghdam et al., "Specifying and Placing Chains of Virtual Network Functions," 2014 IEEE $3^{rd}$ International Conference on Cloud Networking (CloudNet), 2014, IEEE.
International Search Report and Written Opinion dated Feb. 10, 2017 in International Application No. PCT/US2016/062159.
Baba et al., "Lightweight Virtualized Evolved Packet Core Architecture for Future Mobile Communication," 2015 IEEE Wireless Communications and Networking Conference (WCNC), Mar. 9-12, 2015, pp. 1811-1816, IEEE.
ETSI, "Network Functions Virtualisation (NFV); Management and Orchestration," Group Specification, Dec. 2014, ETSI GS NFV-MAN 001 V1.1.1.
U.S. Office Action dated Dec. 15, 2017 in U.S. Appl. No. 14/941,845.
U.S. Office Action dated Jul. 25, 2018 in U.S. Appl. No. 14/941,845.
U.S. Notice of Allowance dated Dec. 17, 2018 in U.S. Appl. No. 14/941,845.

* cited by examiner

MASTER SERVICE ORCHESTRATION OF VIRTUAL NETWORKING FUNCTIONS

CROSS-REFERENCE TO RELATED APPLICATIONS

This patent application is a continuation of and claims priority to U.S. patent application Ser. No. 14/941,845, entitled "Master Service Orchestration of Virtual Networking Functions," filed Nov. 16, 2015, now U.S. Pat. No. 10,277,687, which is incorporated herein by reference in its entirety.

BACKGROUND

Network Functions Virtualization ("NFV") is a new technology initiative that aims to move traditional and evolving mobility networking functions, such as access network elements, core network elements, transport network elements, and others, from purpose-built hardware to commercial-off-the-shelf ("COTS") server-based platforms. This is achieved through virtualization of mobility networking functions to create virtual networking functions ("VNFs") that operate on COTS hardware.

In recent years, the European Telecommunications Standards Institute ("ETSI") Industry Specification Group ("ISG") has defined and formulated the NFV architecture. There are, however, many enhancements needed for mobility networking functions to inter-operate correctly in a VNF model and to deliver performance comparable to or better than that of the physical networking function ("PNF") model deployed today.

Current mobility network infrastructure is PNF-based and involves a mix of multiple vendor-specific legacy platforms. The inherent complexity of the current mobility network infrastructure results in difficult design, field installation, addressing, and interoperability to ensure nodal as well as end-to-end system functionality. The PNF-based architecture tags along with a complex network service layer monitoring infrastructure that cannot be persistent as network transformation takes place. Dedicated and expensive monitoring equipment needs to be replaced via integrated monitoring so that the data infrastructure can leverage direct access to monitoring information from the virtualized infrastructure across multiple data centers.

SUMMARY

Concepts and technologies disclosed herein are directed to master service orchestration of VNFs. According to one aspect of the concepts and technologies disclosed herein an NFV platform includes a hardware resources layer including a plurality of hardware resources, a plurality of VNF resource pools, a plurality of service controllers corresponding to the plurality of VNF resource pools, and a master service orchestrator. The master service orchestrator can, when executed by at least a portion of the plurality of hardware resources, cause the master service orchestrator to perform operations. In particular, the master service orchestrator can receive, from a user equipment ("UE"), a service request. The master service orchestrator also can instruct a service controller of the plurality of service controllers to perform service controller-specific operations to provide, at least in part, a service included within the service request received from the UE.

In some embodiments, the plurality of service controllers includes a radio access network ("RAN") service controller that maintains a topology of a RAN with which the UE is capable of communicating for the service.

In some embodiments, the plurality of service controllers includes a mobility management entity ("MME") service controller that instantiates and manages a virtual MME in a MME pool of the plurality of VNF resource pools. In these embodiments, the master service orchestrator instructs the MME service controller to instantiate and manage the virtual MME in the MME pool of the plurality of VNF resources pools to provide, at least in part, the service included within the service request.

In some embodiments, the plurality of service controllers includes a diameter routing agent ("DRA") service controller that instantiates and manages a virtual DRA in a DRA pool of the plurality of VNF resource pools. In these embodiments, the master service orchestrator instructs the DRA service controller to instantiate and manage the virtual DRA in the DRA pool of the plurality of VNF resources pools to provide, at least in part, the service included within the service request.

In some embodiments, the plurality of service controllers includes a home subscriber server ("HSS") controller that instantiates and manages a virtual HSS in a HSS pool of the plurality of VNF resource pools. In these embodiments, the master service orchestrator instructs the HSS controller to instantiate and manage the virtual HSS in the HSS pool of the plurality of VNF resources pools to provide, at least in part, the service included within the service request.

In some embodiments, the plurality of service controllers includes a serving gateway ("SGW") service controller that instantiates and manages a virtual SGW in a SGW pool of the plurality of VNF resource pools. In these embodiments, the master service orchestrator instructs the SGW service controller to instantiate and manage the virtual SGW in the SGW pool of the plurality of VNF resources pools to provide, at least in part, the service included within the service request.

In some embodiments, the plurality of service controllers includes a packet data network ("PDN") gateway ("PGW") service controller that instantiates and manages a virtual PGW in a PGW pool of the plurality of VNF resource pools. In these embodiments, the master service orchestrator instructs the PGW service controller to instantiate and manage the virtual PGW in the PGW pool of the plurality of virtual network function resources pools to provide, at least in part, the service comprised within the service request.

In some embodiments, the plurality of service controllers includes a policy and charging rules function ("PCRF") service controller that instantiates and manages a virtual PCRF in a PCRF pool of the plurality of VNF resource pools. In some embodiments, the master service orchestrator instructs the PCRF service controller to instantiate and manage the virtual PCRF in the PCRF pool of the plurality of VNF resources pools to provide, at least in part, the service included within the service request.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
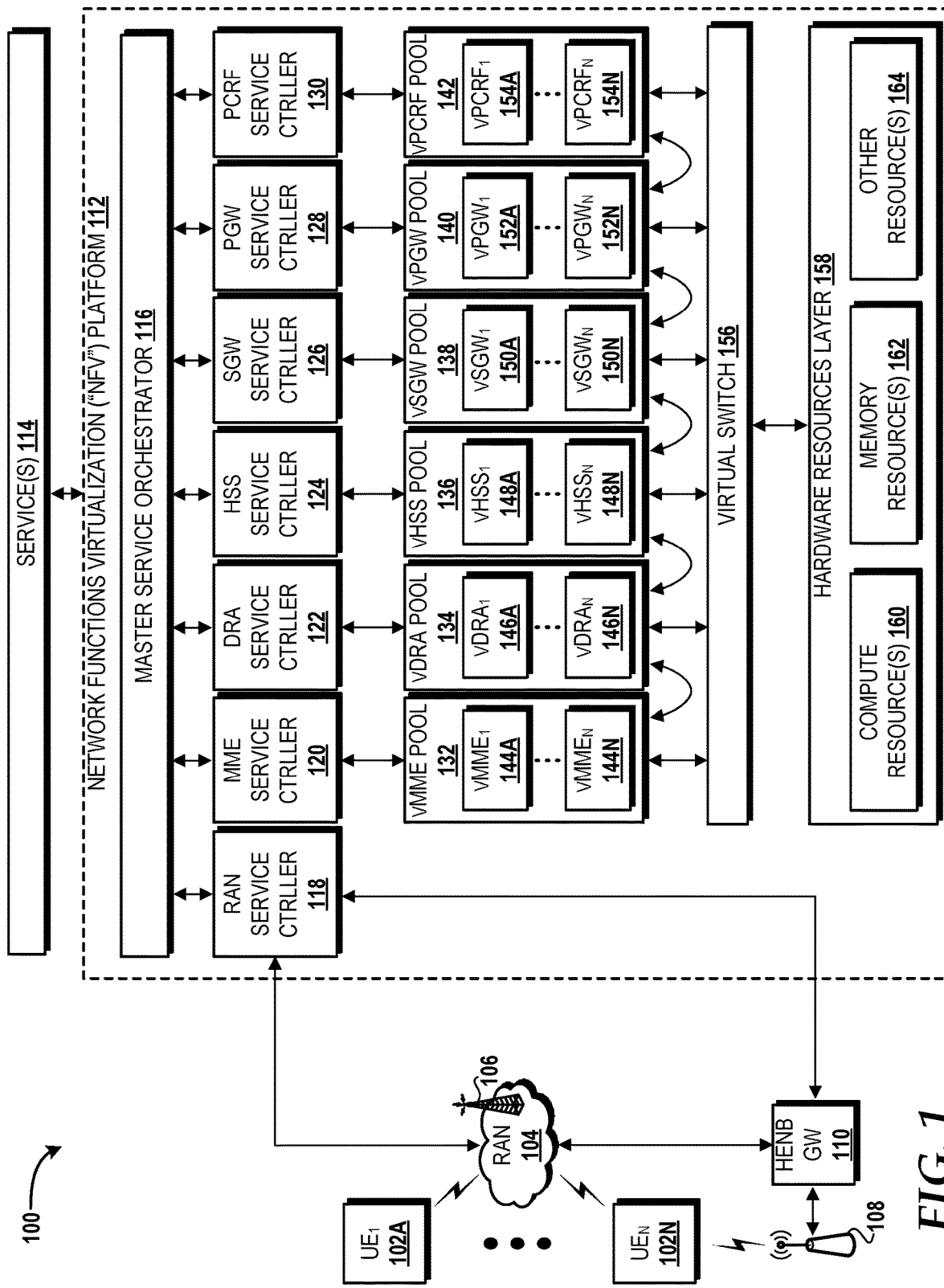
FIG. 1 is a block diagram illustrating aspects of an illustrative operating environment in which the various concepts and technologies disclosed herein can be implemented.

Concepts and technologies disclosed herein are directed to master service orchestration of VNFs. More particularly, the concepts and technologies disclosed herein provide intelligent service layer orchestration and management for VNF resource sharing that is fundamental to the effective interworking of all the underlying VNFs in a data center to realize end-to-end mobility network functionality. The service chaining aspects of these multiple VNF elements ensures that legacy services are maintained and that new services can be launched with similar or better performance so that there is no end user impact in terms of service quality and reliability, thereby reducing subscriber churn.

In a traditional Long-Term Evolution ("LTE") network infrastructure model, the core network elements, such as the MME, the HSS, the SGW, the PGW, and the PCRF, are utilized in conjunction with a RAN and a UE to establish the signaling/control plane and user plane data. These elements are designed to perform PNFs and can be configured in a single pool or across multiple pool environments. The actual design and deployment configurations of these PNFs in data centers varies according to the network operator's needs. Moreover, these PNFs are standalone in nature and have hardware-software subsystems that are tightly coupled with each other to realize a given LTE application function. By way of example, the hardware of an MME-PNF cannot be shared with the SGW/PGW-PNF as these functions might be sourced from different vendors and are not inherently designed to support sharing.

By virtualizing LTE network functions as VNFs, it is possible to decouple the hardware and software subsystems of PNFs across multiple vendors and align towards use of a unified COTS server hardware upon which the application can be run as a software function. With a unified hardware resources model that is cost-effective, it is possible to share these resources, to develop various PNFs as VNF software building blocks, and to optimize the VNFs independently to obtain the best possible performance.

The VNFs operate on a common set of hardware resources, including, for example, compute resources, memory resources, input/output resources, storage resources, and the like. A virtual switch/router can be shared across the VNFs on-demand for a given service with the use of a service layer orchestration. The use of an intelligent orchestration layer for VNF-based service chaining and resource sharing on-demand within a given pool results in effective utilization of the hardware and software functions for a given user service. The concepts and technologies disclosed herein provide such a service layer orchestrator that can work across the VNFs, chaining at least a portion of the VNFS for a given service type, monitoring the status thereof, and utilizing the pooled VNF resources effectively to deliver a robust service to the end user.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

While connections are shown between some of the components illustrated in FIG. 1, it should be understood that some, none, or all of the components illustrated in FIG. 1 can be configured to interact with one other to carry out various functions described herein. Thus, it should be understood that FIG. 1 and the following description are intended to provide a general understanding of a suitable environment in which various aspects of embodiments can be implemented, and should not be construed as being limiting in any way.

Referring now to FIG. 1, an illustrative operating environment 100 in which the various concepts and technologies disclosed herein can be implemented will be described. The operating environment 100 provides service layer orchestration, wherein PNFs associated with a network design are realized as VNFs utilizing a unified COTS hardware and flexible resources shared model with the application software running as a virtual machine. The dynamic service control layer across multiple VNFs during service chaining is realized within an orchestration function that can assign, track, and release the COTS resources on-demand from a pooled set of resources for a given user and for a given service type.

The illustrated operating environment 100 includes a plurality of user equipment devices ("UEs") 102A-102N (referred to herein collectively as UEs 102, or generally in the singular form as UE 102) operating in communication with a radio access network ("RAN") 104. The UEs 102 can communicate with the RAN 104 by way of one or more eNodeBs ("eNBs"), such as an eNB 106 and/or a home eNB 108. For implementations in which a UE, such as the UEN 102N in the illustrated example, connects to the home eNB 108 for access to the RAN 104, the home eNB 108 can route to the RAN 104 via a home eNB gateway ("HeNB GW") 110. The HeNB GW 110 provides control capability to manage one or more home eNBs, such as the illustrated home eNB 108. The HeNB GW 110, in some embodiments, is configured in accordance with 3GPP Technical Release 23.830 architecture. The HeNB GW 110 can be configured in accordance with future 3GPP-defined architectures or can be configured in accordance with a proprietary architecture. Although the HeNB GW 110 is shown as supporting only the home eNB 108, it is contemplated that the HeNB GW 110 can support multiple home eNBs configured the same as or similar to the home eNB 108. Likewise, although only a single eNB 106 is shown, the RAN 104 can support multiple eNBs configured the same as or similar to the eNB 106.

Each of the UEs 102 can be a cellular phone, a feature phone, a smartphone, a mobile computing device, a tablet computing device, a portable television, a portable video game console, or the like capable of communicating with the RAN 104. The RAN 104 can include one or more service areas (which may also be referred to herein as "cells") having the same or different cell sizes, which may be represented by different cell-types. As used herein, a "cell" refers to a geographical area that is served by one or more base stations operating within an access network. The cells within the RAN 104 can include the same or different cell sizes, which may be represented by different cell-types. A cell-type can be associated with certain dimensional characteristics that define the effective radio range of a cell. Cell-types can include, but are not limited to, a macro cell-type, a metro cell-type, a femto cell-type, a pico cell-type, a micro cell-type, wireless local area network ("WLAN") cell-type, a MSMC cell-type, and a white space network cell-type. For ease of explanation, a "small cell" cell-type is utilized herein to collectively refer to a group of cell-types that includes femto cell-type (e.g., home eNB 108), pico cell-type, and micro cell-type, in general contrast to a macro cell-type, which offers a larger coverage area. Other cell-types, including proprietary cell-types and temporary cell-types are also contemplated. Although in the illustrated example, the UEs 102 are shown as being in communication with one RAN (i.e., the RAN 104), the UEs 102 may be in communication with any number of access networks, including networks that incorporate collocated WWAN WI-FI and cellular technologies, and as such, the UEs 102 can be dual-mode devices.

The RAN 104 can operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), LTE, Worldwide Interoperability for Microwave Access ("WiMAX"), other current 3GPP cellular technologies, other future 3GPP cellular technologies, combinations thereof, and/or the like. The RAN 104 can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the UEs 102. Data communications can be provided in part by the RAN 104 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the RAN 104 may be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like. The concepts and technologies disclosed herein will be described in context of the RAN 104 operating in accordance with LTE, although those skilled in the art will appreciate the applicability of the concepts and technologies disclosed herein to other cellular technologies, including, in particular, those captured within future generation 3GPP standards. Moreover, in some embodiments, the RAN 104 is or includes a virtual RAN ("vRAN").

As used herein, a "base station" refers to a radio receiver and/or transmitter (collectively, transceiver) that is/are configured to provide a radio/air interface over which one or more of the UEs 102, can connect to a network. Accordingly, a base station is intended to encompass one or more base transceiver stations ("BTSs"), one or more NBs, one or more eNBs (e.g., the eNB 106), one or more home eNBs (e.g., the home eNB 108), one or more wireless access points ("APs"), one or more multi-standard metro cell ("MSMC") nodes, and/or other networking nodes or combinations thereof that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to and from one or more devices, such as the UEs 102.

The RAN 104 is in communication with a network provided, at least in part, by a NFV platform 112. The NFV platform 112, in turn, provides the UEs 102 access to one or more services 114. The service(s) 114 can include any mobile telecommunications services, some examples of which include, but are not limited to, voice services (e.g., voice over IP) and data services.

The illustrated NFV platform 112 includes a master service orchestrator 116 that orchestrates instantiation of VNFs, monitoring of VNFs, and management of VNFs, including performance tuning as needed, to provide one or more of the services 114 to the UEs 102. More particularly, the master service orchestrator 116 performs orchestration operations to instruct a plurality of VNF service controllers 118-130 to control a plurality of VNF pools 132-142, each containing one or more virtual resources for a specific type of VNF. In this manner, the master service orchestrator 116 provides an intelligent orchestration layer for VNF-based service chaining and resource sharing.

The master service orchestrator 116 is a master service controller engine that is aware of the states of the VNF service controllers 118-130 at the nodal level (e.g., a specific VNF within a VNF pool) and/or the VNF pool 132-142 level. The states can include an active-ON state, an idle-ON state, and an OFF state depending upon the master service controller operational and traffic management status. In some embodiments, each VNF in a VNF pool, such as one of the VNF pools 132-142, can have a service controller, such as one of the VNF service controllers 118-130, associated therewith that keeps track of all the UEs 102 being served by that VNF. In some other embodiments, each VNF pool, such as one of the VNF pools 132-142, can have a service controller, such as one of the VNF service controllers 118-130, that keeps track of all the UEs 102 being served in that VNF pool. These VNF-specific and VNF pool-specific service controllers are tracked by the master service orchestrator 116 to maintain synchronized states to extract various information, including, but not limited to, context, quality-per-application, and bearer profiles. This information can be used by an analytics engine of the master service orchestrator 116 for data mining. The master service orchestrator 116 use this information to dynamically allocate and/or alter the resource utilization on-demand within a given VNF or across multiple VNFs during the course of network changes or upgrades, error conditions, failover situations, and the like.

The plurality of VNF service controllers 118-130 includes a RAN service controller 118, an MME service controller 120, a DRA service controller 122, a HSS service controller 124, a SGW service controller 126, a PGW service controller 128, and a PCRF service controller 130. In the illustrated embodiment, the MME service controller 120 controls a virtual MME ("vMME") pool 132; the DRA service controller 122 controls a virtual DRA ("vDRA") pool 134; the HSS service controller 124 controls a virtual HSS ("vHSS") pool 136; the SGW service controller 126 controls a virtual SGW ("vSGW") pool 138; the PGW service controller 128 controls a virtual PGW ("vPGW") pool 140; and the PCRF service controller 130 controls a virtual PCRF ("vPCRF") pool 142. Each of the VNF pools 132-142 includes a corresponding one or more VNFs, which can be instantiated by the corresponding one of the VNF service controllers 118-130 at the instruction of the master service orchestrator 116. In particular, the vMME pool 132 includes one or more vMMEs 144A-144N; the vDRA pool 134 includes one or more vDRAs 146A-146N; the vHSS pool 136 includes one or more vHSSs 148A-148N; the vSGW pool 138 includes one or more vSGWs 150A-150N; the vPGW pool 140 includes one or more vPGWs 152A-152N; and the vPCRF pool 142 includes one or more vPCRFs 154A-154N. The VNF service controllers 120-130, in some embodiments, can control individual VNFs independent of a VNF pool. In other embodiments, the VNF service controllers 120-130 control the VNF pools 132-142 and additional controllers (not shown) control the individual VNFs within the VNF pools 132-142.

The vMMEs 144A-144N can perform MME PNF operations. For example, the vMMEs 144A-144N can control signaling related to mobility and security for E-UTRAN access, such as via the RAN 104, by the UEs 102, and can track and page the UEs 102 when the UEs 102 are in idle-mode. The vMMEs 144A-144N can be configured in accordance with 3GPP standards specifications.

The vDRAs 146A-146N can perform DRA PNF operations. The vDRAs 146A-146N can provide real-time routing capabilities to ensure that messages are routed among the correct elements in the network. The vDRAs 146A-146N can be configured in accordance with 3GPP standards specifications.

The vHSSs 148A-148N can perform HSS PNF operations. The vHSSs 148A-148N can include databases that contain user/subscriber information. The vHSSs 148A-148N also can perform operations to support mobility management, call and session setup, user authentication, and access authorization. The vHSSs 148A-148N can be configured in accordance with 3GPP standards specifications.

The vSGWs 150A-150N can perform SGW PNF operations. The vSGWs 150A-150N can serve the UEs 102 by routing incoming and outgoing IP packets. The vSGWs 150A-150N also can provide an anchor point for intra-LTE mobility (e.g., handover between eNodeBs operating within the RAN 104) and an anchor point between the RAN 104 and other RANs (not shown). The vSGWs 150A-150N can be configured in accordance with 3GPP standards specifications.

The vPGWs 152A-152N can perform PGW PNF operations. The vPGWs 152A-152N can interact with one or more PDNs (not shown). The PDN gateway function also performs IP address/IP prefix allocation, policy control, and charging operations. The vPGWs 152A-152N can be configured in accordance with 3GPP standards specifications.

The vPCRFs 154A-154N can perform PCRF PNF operations. The vPCRFs 154A-154N can determine policy rules, detect service data flows, enforce policies, and perform flow-based charging. The vPCRFs 154A-154N can be configured in accordance with 3GPP standards specifications.

Each of the VNF service controllers 118-130 manages the services and/or applications supported by a corresponding VNF type. For example, the MME service controller 120 can manage the services and/or applications supported by a given one or more of the vMMEs 144 on per UE and International Mobile Subscriber Identity ("IMSI") (UE/IMSI) context basis. This could include information per service type such as, for example, access point name ("APN"), quality of service ("QoS") class identifier ("QCI"), and bearer ID. Similarly, each node can have its own service controller that deals with the appropriate services and/or applications supported on per UE/IMSI basis. When these VNFs are chained to provide an end-to-end service interworking with the correct RAN technology, the service controllers of each of these VNFs are synchronized so as to maintain the state per UE to deliver a given service. An example implementation of the MME service controller 120 is described herein below with reference to FIG. 2.

The RAN service controller 118 provides entry into the NFV platform 112 via the RAN 104 and the HeNB GW 110. The RAN service controller 118 can control operations of the RAN 104 and the HeNB GW 110. The RAN service controller 118 can maintain a RAN topology for the RAN 104 (and other RANs not shown) as well as control RAN resources. In some embodiments, the RAN 104 is or includes a vRAN that executes upon hardware resources described below.

Each of the VNF pools 132-142 is in communication with a virtual switch 156. The virtual switch 156 can be a virtual multilayer switch that provides a switching stack for the NFV platform 112. In some embodiments, the virtual switch 156 is an OPEN VSWITCH, available from openvswitch.org. In some embodiments, the virtual switch 156 is a proprietary virtual network switch implementation.

The virtual switch 156 operates in communication with a hardware resources layer 158. The hardware resources layer 158 provides hardware resources, which, in the illustrated embodiment, include one or more compute resources 160, one or more memory resources 162, and one or more other resources 164. The compute resource(s) 160 can include one or more hardware components that perform computations to process data, and/or to execute computer-executable instructions of one or more application programs, operating systems, and/or other software. The compute resources 160 can include one or more central processing units ("CPUs") configured with one or more processing cores. The compute resources 160 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 160 can include one or more discrete GPUs. In some other embodiments, the compute resources 160 can include CPU and GPU components that are configured in accordance with a co-processing CPU/GPU computing model, wherein the sequential part of an application executes on the CPU and the computationally-intensive part is accelerated by the GPU. The compute resources 160 can include one or more system-on-chip ("SoC") components along with one or more other components, including, for example, one or more of the memory resources 162, and/or one or more of the other resources 164. In some embodiments, the compute resources 160 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 160 can be or can include one or more hardware components architected in accordance with an ARM architecture, available for license from ARM HOLDINGS of Cambridge, United Kingdom. Alternatively, the compute resources 160 can be or can include one or more hardware components architected in accordance with an x86 architecture, such an architecture available from INTEL CORPORATION of Mountain View, Calif., and others. Those skilled in the art will appreciate the implementation of the compute resources 160 can utilize various computation architectures, and as such, the compute resources 160 should not be construed as being limited to any particular computation architecture or combination of computation architectures, including those explicitly disclosed herein.

The memory resource(s) 162 can include one or more hardware components that perform storage operations, including temporary or permanent storage operations. In some embodiments, the memory resource(s) 162 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 160.

The other resource(s) 164 can include any other hardware resources that can be utilized by the compute resources(s) 160 and/or the memory resource(s) 162 to perform operations described herein. The other resource(s) 164 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

Turning back to the master service orchestrator 116, the master service orchestrator 116 can continuously monitor the virtual resources in the VNF pools 132-142 and can fine tune performance of the virtual resources by instructing the VNF service controllers 118-130 to manage the VNF pools 132-142. Since several of the VMs within a VNF and across multiple VNFs interwork with each other via service chaining for a given user session/service, the inter-VNF communication for a given service chain and across such multiple service chains for users should be robust enough so that there are no latency issues in processing packets of any length/size. If there are any latencies between VNF communications that exceed a pre-defined threshold, the master service orchestrator 116 can prompt one or more of the VNF service controllers 118-130 to accelerate corresponding packets through the virtual switch 156 across the VNF pools 132-142 to maintain integrity with respect to internal service assurance or could take an alternate VNF-VNF path across the VNF pools 132-142 if the alternate path meets inter-VNF communication service assurance criteria.

Besides inter-VNF communication, the master service orchestrator 116 continuously monitors each of the VNFs across the VNF pools 132-142 and ensures that the correct VNFs are instantiated and selected for a given service requested by one or more of the UEs 102. For example, if a user needs to be served with LTE-broadcast, the master service orchestrator 116 can assign a set of core network virtual resources from the VNF pools 132-142 to handle the broadcast service. Once the service has been delivered and completed, the VNFs are released followed by a report generation for such service.

The master service orchestrator 116 allows for evaluating a virtual data center in terms of its resiliency and performance with a net score. Virtual data centers that need to be setup and torn down on-demand to address specific user traffic loading, resource allocation and sharing, mobility events, and the like could utilize the master service orchestrator 116 to evaluate real-time performance so that the subject virtual data center can be used as a baseline standard for hosting future events in a secure and stable manner without disrupting normal mobility consumer traffic serving network.

The master service orchestrator 116 can ensure that the services 114 provided to mobility customers are not impacted due to service chaining between VNFs. If, for a given service, the master service orchestrator 116 detects a potential packet processing issue during VNF chaining, the master service orchestrator 116 can take a proactive action to reallocate the virtual resources between the VNF pools 132-142 for that specific user/service.

The master service orchestrator 116 relies on an internal analytics engine that can tap into the IP streams for a given service data flow for the duration of a session/call during the service chaining across the VNFs and extract a score that the master service orchestrator 116 can use to compare against an internally provisioned baseline. Such scores could vary depending on the type of service(s) that an individual user may have subscribed to and can be used to continuously evaluate how the transformed network/service is performing for customers.

The master service orchestrator 116 ensures radio spectrum and core network resources, simultaneous voice/video/data/messaging, multi-party conferencing services, and the like are effectively served and utilized so that legacy (e.g., 3G and 2G) systems can be retired quickly and the associated spectrum re-used for emerging wireless technologies (e.g., 5G) in delivering enhanced services to mobile consumers with rich multimedia services over a virtualized network infrastructure in a data center.

When a UE 102 moves out of a LTE coverage area, the master service orchestrator 116 can monitor user-service fall back to underlying legacy network and ensure that its service is fully met while the UE 102 is served by the legacy infrastructure that may not be virtualized in the operator's network. Tighter integration of the 3G network management systems with the master service orchestrator 116 can ensure such a reliable monitoring and assurance engine is in place to minimize subscriber churn when associated with dynamic user mobility patterns in the network.

The master service orchestrator 116 not only facilitates in the orchestration of various mobility core network components in the end-to-end signaling data path once the UE 102 attaches into the network via an MME, such as one of the vMMEs 144, as the entry point in the network, but also considers the source of the attach request—that is, whether the attach request originates from a service macro eNB, such as the eNB 106, or a small cell eNB, such as the home eNB 108, via the HeNB GW 110. The master service orchestrator 116 extracts access network topology information from the RAN service controller 118 that handles the RAN 104 and chains individual services in a cell across multiple core network elements from the VNF pools 132-142. The master service orchestrator 116 can utilize the dynamic mobility patterns of the users at the cell sector level and can tie the VNF resources to provide the optimal connectivity and routing path on a per user-service flow basis.

It is possible that a given class of UE/devices may belong to certain machine-to-machine ("M2M") and Internet of things ("IoT") industry verticals that need to attach to a service specific MME. The MME service controller 120 analyzes and maintains a service database that can track per-IMSI/per-service specific context level information that can be used in the allocation of MME resources on-demand, and the MME service controller 120 can use this information to correlate the overall nodal and network performance when multiple services are being requested or offered to a user/device.

For example, the MME service controller 120 can interwork with the DRA service controller 122 and the HSS service controller 124 to determine service specific diameter signaling routing within a group of resources for optimal chaining and routing. Once the diameter service chain has been established and transactions completed successfully with the DRA service controller 122 and the HSS service controller 124, the MME service controller 120 can work with the SGW service controller 126, the PGW service controller 128, and the PCRF service controller 130 to determine the best possible GW/PCRF resources that are within proximity to establish session management procedures.

Once the end-to-end signaling data path is set up, the respective node-specific service controllers can align with the master service orchestrator 116 to ensure their nodal resources are locked for a given service. Having a smarter service specific control within each node locally and globally within the master service orchestrator 116 helps to maintain a unique relationship for the end-to-end service across the mobility network and optimally utilize such resources as the service dynamics change in the network. These nodes also can have local analytics engines that interwork with the master analytics engine in the master service orchestrator 116 that can analyze, maintain, and report the dynamics of the resources tied to specific services per given service chain. This information can in turn be utilized by service providers as well as application providers to create innovative and targeted services to a given user or set of users/devices.

Figure 2:
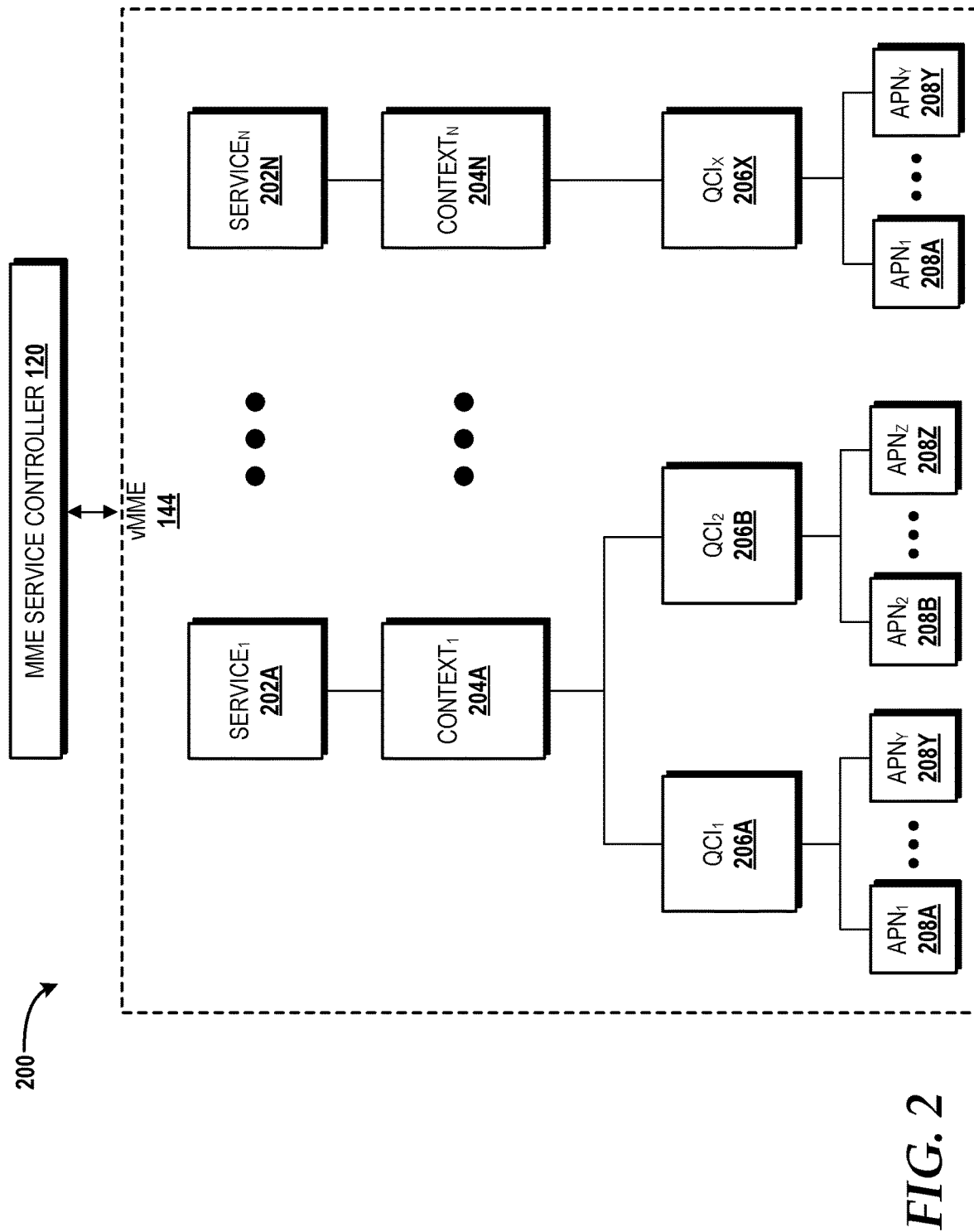
FIG. 2 is a block diagram illustrating a MME service implementation example, according to an illustrative embodiment.

Turning now to FIG. 2, a block diagram illustrating an MME service implementation example 200 will be described, according to an illustrative embodiment. The MME service implementation example 200 includes the MME service controller 120 introduced above in FIG. 1. The MME service controller 120 manages a plurality of services 202A-202N by a given one of the vMMEs 144 on a per UE/IMSI context basis. In the illustrated example, the service$_1$ 202A provides a context$_1$ 204A and the servicers 202N provides a context$_N$ 204N. The context$_1$ 204A is associated with two QCIs—QCI$_1$ 206A and QCI$_2$ 206B. The context$_N$ 204N is associated with one QCI—QCI$_x$ 206X. The QCI$_1$ 206A can be accessed via an APN$_1$ 208A and an APN$_Y$ 208Y. The QCI$_2$ 206B can be accessed via an APN$_2$ 208B and an APN$_Z$ 208Z. The QCI$_x$ 206X can be accessed via the APN$_1$ 208A and the APN$_Y$ 208Y. It should be understood that a given one of the vMMEs 144 can provide any number of services, each supporting any number of contexts for any number of QCIs accessible via any number of APNs. As such, the MME service implementation example 200 should not be construed as being limiting in any way.

Figure 3A:
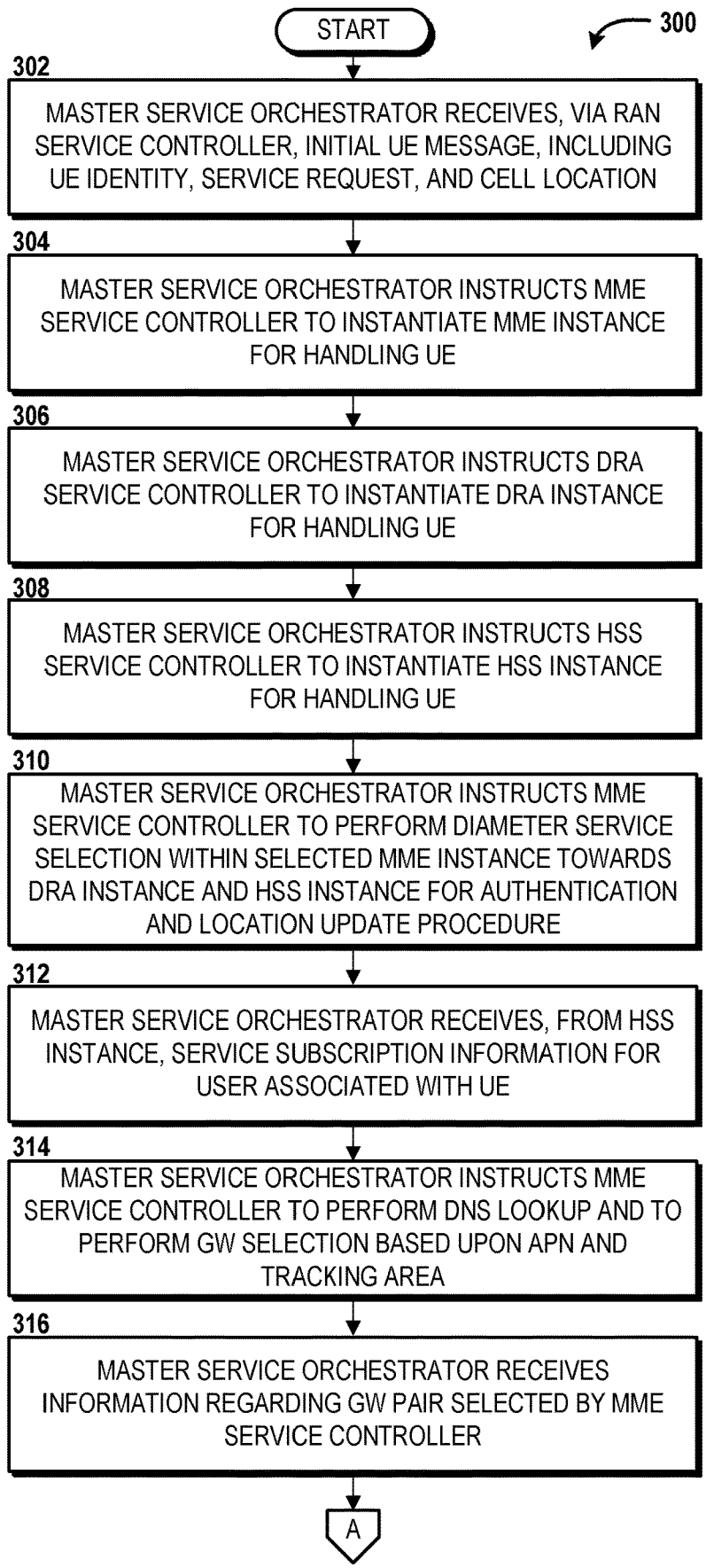
FIGS. 3A-3B are flow diagrams illustrating aspects of a method for operating a master service orchestrator for the orchestration of VNFs, according to an illustrative embodiment.
Figure 3B:
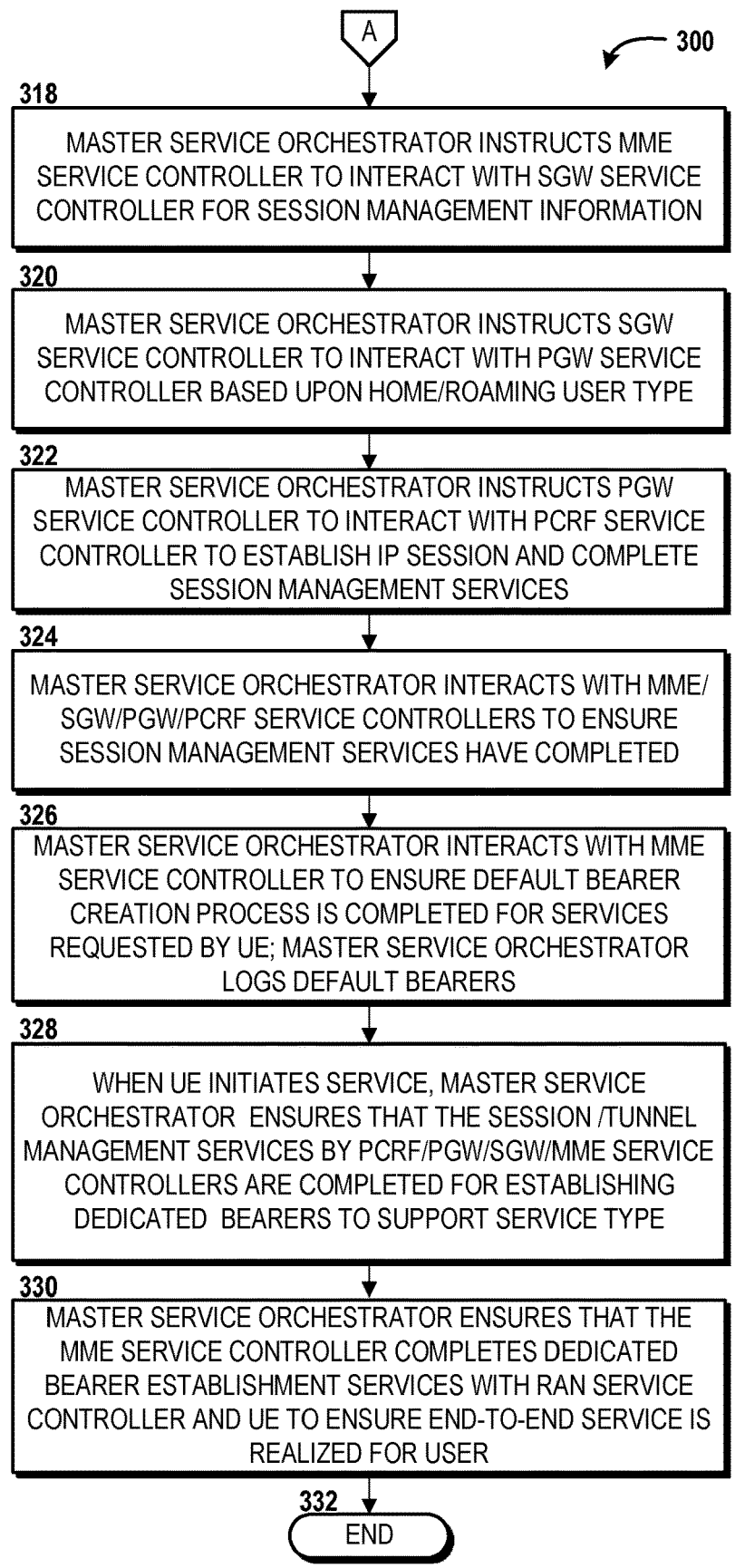

Turning now to FIGS. 3A-3B, aspects of a method 300 for orchestrating services within the NFV platform 112 via the master service orchestrator 116 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of the hardware resources layer 158, such as one or more of the compute resources 160, and/or a processor one or more other computing systems and/or devices disclosed herein to perform operations.

For purposes of illustrating and describing some of the concepts of the present disclosure, the methods disclosed herein are described as being performed, at least in part, by the master service orchestrator 116 via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 will be described with reference to FIGS. 3A-3B and further reference to FIG. 1. The method 300 begins at operation 302, where the master service orchestrator 116 receives, via the RAN service controller 118, an initial UE message, including a UE identity, a service request, and a cell location associated with the UE. The UE identity can include an IMSI.

From operation 302, the method 300 proceeds to operation 304, where the master service orchestrator 116 instructs the MME service controller 120 to instantiate an MME instance—that is, one or more of the vMMEs 144—for handling the $UE_1$ 102. From operation 304, the method 300 proceeds to operation 306, where the master service orchestrator 116 instructs the DRA service controller 122 to instantiate a DRA instance—that is, one or more of the vDRAs 146—for handling the UE 102. From operation 306, the method 300 proceeds to operation 308, where the master service orchestrator 116 instructs the HSS service controller 124 to instantiate an HSS instance—that is, one or more of the vHSSs 148—for handling the UE 102. From operation 308, the method 300 proceeds to operation 310, where the master service orchestrator 116 instructs the MME service controller 120 to perform diameter service selection within the MME instance towards the DRA instance and the HSS instance for performing an authentication and location update procedure. From operation 310, the method 300 proceeds to operation 312, where the master service orchestrator 116 receives, from the HSS instance, service subscription information for a user associated with the UE 102.

As an example, depending upon a new service initiated from the UE 102, the master service orchestrator 116 is cognizant of the various cross-functional service controllers (e.g., some combination of the VNF service controllers 118-130) that the master service orchestrator 116 needs to instantiate for the new service. Such a trigger for specific service controllers can be based on an internal mapping within the master service orchestrator 116 and/or derived from an analytics engine (not shown) that maintains a database (also not shown) of all the network elements required to form/deliver a service. In case of certain applications, such as M2M/IoT, that can be delivered via control plane messaging procedures without the need for session management, the master service orchestrator 116 might not trigger any interactions with the SGW service controller 126, the PGW service controller 128, and the PCRF service controller 130 for dynamic selection of gateway network elements (e.g., one of the vSGWs 150 and one of the VPGWs 152) if such session management procedures and associated IP packet data connections are not required for the new service.

From operation 312, the method 300 proceeds to operation 314, where the master service orchestrator 116 instructs the MME service controller 120 to perform DNS lookup and to perform GW selection based upon the APN to which the UE 102 is attached and the tracking area of the UE 102. From operation 314, the method 300 proceeds to operation 316, where the master service orchestrator 116 receives information regarding a GW pair selected by the MME service controller 120 at the instruction of the master service orchestrator 116 at operation 314.

From operation 316, the method 300 proceeds to operation 318 (shown in FIG. 3B), where the master service orchestrator 116 instructs the MME service controller 120 to interact with the SGW service controller 126 for session management information. From operation 318, the method 300 proceeds to operation 320, where the master service orchestrator 116 instructs the SGW service controller 126 to interact with the PGW service controller 128 based upon home/roaming user type.

From operation 320, the method 300 proceeds to operation 322, where the master service orchestrator 116 instructs the PGW service controller 128 to interact with the PCRF service controller 130 to establish an IP session for the UE 102 and to complete session management services for the IP session. From operation 322, the method 300 proceeds to operation 324, where the master service orchestrator 116 interacts with the MME service controller 120, the SGW service controller 126, the PGW service controller 128, and the PCRF service controller 130 to ensure that the session management services have completed.

From operation 324, the method 300 proceeds to operation 326, where the master service orchestrator 116 interacts with the MME service controller 120 to ensure a default bearer creation process is completed for one or more of the service(s) 114 requested by the UE 102. In addition, the master service orchestrator 116 logs the default bearers created during the default bearer creation process. From operation 326, the method 300 proceeds to operation 328, where the master service orchestrator 116 ensures that, when the UE 102 initiates service, the session/tunnel management services provided by the vPCRF 154, the vPGW 152, the vSGW 150, and the vMME 144 are completed for establishing dedicated bearers to support the service type.

From operation 328, the method 300 proceeds to operation 330, where the master service orchestrator 116 ensures that the MME service controller 120 completes the dedicated bearer establishment services with the RAN service controller 118 and the UE 102 to ensure end-to-end service is realized for the user associated with the UE 102. From operation 330, the method 300 proceeds to operation 332, where the method 300 ends.

Figure 4:
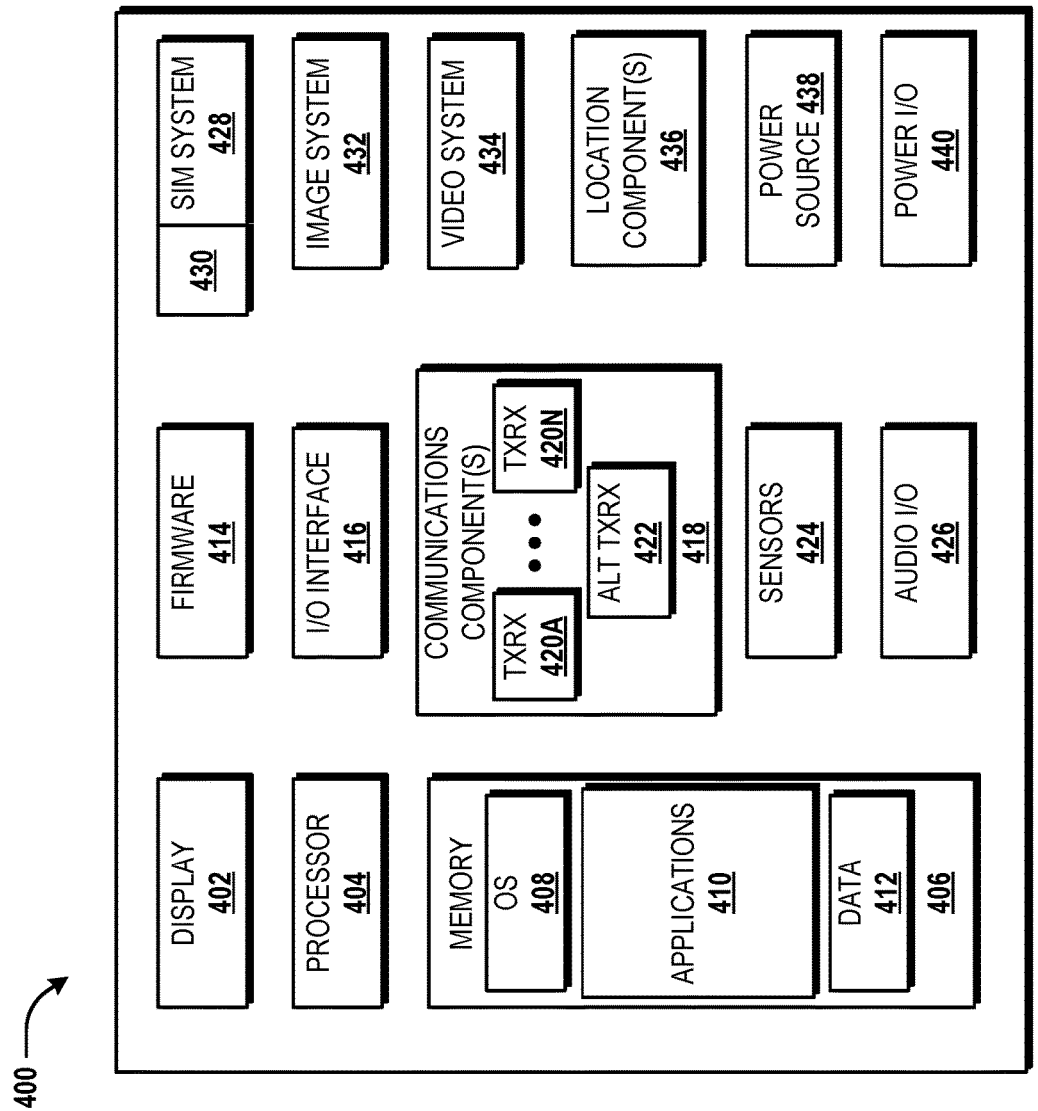
FIG. 4 is a block diagram illustrating an example mobile device capable of implementing aspects of the embodiments disclosed herein.

Turning now to FIG. 4, an illustrative mobile device 400 and components thereof will be described. In some embodiments, one or more of the UEs 102 (shown in FIG. 1) can be configured like the mobile device 400. While connections are not shown between the various components illustrated in FIG. 4, it should be understood that some, none, or all of the components illustrated in FIG. 4 can be configured to interact with one other to carry out various device functions. In some embodiments, the components are arranged so as to communicate via one or more busses (not shown). Thus, it should be understood that FIG. 4 and the following description are intended to provide a general understanding of a suitable environment in which various aspects of embodiments can be implemented, and should not be construed as being limiting in any way.

As illustrated in FIG. 4, the mobile device 400 can include a display 402 for displaying data. According to various embodiments, the display 402 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 400 also can include a processor 404 and a memory or other data storage device ("memory") 406. The processor 404 can be configured to process data and/or can execute computer-executable instructions stored in the memory 406. The computer-executable instructions executed by the processor 404 can include, for example, an operating system 408, one or more applications 410, other computer-executable instructions stored in a memory 406, or the like. In some embodiments, the applications 410 also can include a user interface ("UP") application (not illustrated in FIG. 4).

The UI application can interface with the operating system 408 to facilitate user interaction with functionality and/or data stored at the mobile device 400 and/or stored elsewhere. In some embodiments, the operating system 408 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 404 to aid a user in entering content, viewing account information, answering/initiating calls, entering/deleting data, entering and setting user IDs and passwords for device access, configuring settings, manipulating address book content and/or settings, multimode interaction, interacting with other applications 410, and otherwise facilitating user interaction with the operating system 408, the applications 410, and/or other types or instances of data 412 that can be stored at the mobile device 400. The data 412 can include, for example, one or more identifiers, and/or other applications or program modules. According to various embodiments, the data 412 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 410, the data 412, and/or portions thereof can be stored in the memory 406 and/or in a firmware 414, and can be executed by the processor 404. The firmware 414 also can store code for execution during device power up and power down operations. It can be appreciated that the firmware 414 can be stored in a volatile or non-volatile data storage device including, but not limited to, the memory 406 and/or a portion thereof.

The mobile device 400 also can include an input/output ("I/O") interface 416. The I/O interface 416 can be configured to support the input/output of data such as location information, user information, organization information, presence status information, user IDs, passwords, and application initiation (start-up) requests. In some embodiments, the I/O interface 416 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ10 port, a proprietary port, combinations thereof, or the like. In some embodiments, the mobile device 400 can be configured to synchronize with another device to transfer content to and/or from the mobile device 400. In some embodiments, the mobile device 400 can be configured to receive updates to one or more of the applications 410 via the I/O interface 416, though this is not necessarily the case. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 416 may be used for communications between the mobile device 400 and a network device or local device.

The mobile device 400 also can include a communications component 418. The communications component 418 can be configured to interface with the processor 404 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 418 includes a multimode communications subsystem for facilitating communications via the cellular network and one or more other networks.

The communications component 418, in some embodiments, includes one or more transceivers. The one or more transceivers, if included, can be configured to communicate over the same and/or different wireless technology standards with respect to one another. For example, in some embodiments one or more of the transceivers of the communications component 418 may be configured to communicate using Global System for Mobile communications ("GSM"), Code Division Multiple Access ("CDMA") ONE, CDMA2000, Long-Term Evolution ("LTE"), and various other 2G, 2.4G, 3G, 4G, and greater generation technology standards. Moreover, the communications component 418 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 418 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 418 can include a first transceiver ("TxRx") 420A that can operate in a first communications mode (e.g., GSM). The communications component 418 also can include an $N^{th}$ transceiver ("TxRx") 420N that can operate in a second communications mode relative to the first transceiver 420A (e.g., UMTS). While two transceivers 420A-420N (hereinafter collectively and/or generically referred to as "transceivers 420") are shown in FIG. 4, it should be appreciated that less than two, two, and/or more than two transceivers 420 can be included in the communications component 418.

The communications component 418 also can include an alternative transceiver ("Alt TxRx") 422 for supporting other types and/or standards of communications. According to various contemplated embodiments, the alternative transceiver 422 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 418 also can facilitate reception from terrestrial radio networks, digital satellite radio networks, internet-based radio service networks, combinations thereof, and the like. The communications component 418 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 400 also can include one or more sensors 424. The sensors 424 can include temperature sensors, light sensors, air quality sensors, movement sensors, orientation sensors, noise sensors, proximity sensors, or the like. As such, it should be understood that the sensors 424 can include, but are not limited to, accelerometers, magnetometers, gyroscopes, infrared sensors, noise sensors, microphones, combinations thereof, or the like. Additionally, audio capabilities for the mobile device 400 may be provided by an audio I/O component 426. The audio I/O component 426 of the mobile device 400 can include one or more speakers for the output of audio signals, one or more microphones for the collection and/or input of audio signals, and/or other audio input and/or output devices.

The illustrated mobile device 400 also can include a subscriber identity module ("SIM") system 428. The SIM system 428 can include a universal SIM ("USIM"), a universal integrated circuit card ("UICC") and/or other identity devices. The SIM system 428 can include and/or can be connected to or inserted into an interface such as a slot interface 430. In some embodiments, the slot interface 430 can be configured to accept insertion of other identity cards or modules for accessing various types of networks. Additionally, or alternatively, the slot interface 430 can be configured to accept multiple subscriber identity cards. Because other devices and/or modules for identifying users and/or the mobile device 400 are contemplated, it should be understood that these embodiments are illustrative, and should not be construed as being limiting in any way.

The mobile device 400 also can include an image capture and processing system 432 ("image system"). The image system 432 can be configured to capture or otherwise obtain photos, videos, and/or other visual information. As such, the image system 432 can include cameras, lenses, charge-coupled devices ("CCDs"), combinations thereof, or the like. The mobile device 400 may also include a video system 434. The video system 434 can be configured to capture, process, record, modify, and/or store video content. Photos and videos obtained using the image system 432 and the video system 434, respectively, may be added as message content to an MMS message, email message, and sent to another mobile device. The video and/or photo content also can be shared with other devices via various types of data transfers via wired and/or wireless communication devices as described herein.

The mobile device 400 also can include one or more location components 436. The location components 436 can be configured to send and/or receive signals to determine a geographic location of the mobile device 400. According to various embodiments, the location components 436 can send and/or receive signals from global positioning system ("GPS") devices, assisted GPS ("A-GPS") devices, WI-FI/WIMAX and/or cellular network triangulation data, combinations thereof, and the like. The location component 436 also can be configured to communicate with the communications component 418 to retrieve triangulation data for determining a location of the mobile device 400. In some embodiments, the location component 436 can interface with cellular network nodes, telephone lines, satellites, location transmitters and/or beacons, wireless network transmitters and receivers, combinations thereof, and the like. In some embodiments, the location component 436 can include and/or can communicate with one or more of the sensors 428 such as a compass, an accelerometer, and/or a gyroscope to determine the orientation of the mobile device 400. Using the location component 436, the mobile device 400 can generate and/or receive data to identify its geographic location, or to transmit data used by other devices to determine the location of the mobile device 400. The location component 436 may include multiple components for determining the location and/or orientation of the mobile device 400.

The illustrated mobile device 400 also can include a power source 438. The power source 438 can include one or more batteries, power supplies, power cells, and/or other power subsystems including alternating current ("AC") and/or direct current ("DC") power devices. The power source 438 also can interface with an external power system or charging equipment via a power I/O component 440. Because the mobile device 400 can include additional and/or alternative components, the above embodiment should be understood as being illustrative of one possible operating environment for various embodiments of the concepts and technologies described herein. The described embodiment of the mobile device 400 is illustrative, and should not be construed as being limiting in any way.

Figure 5:
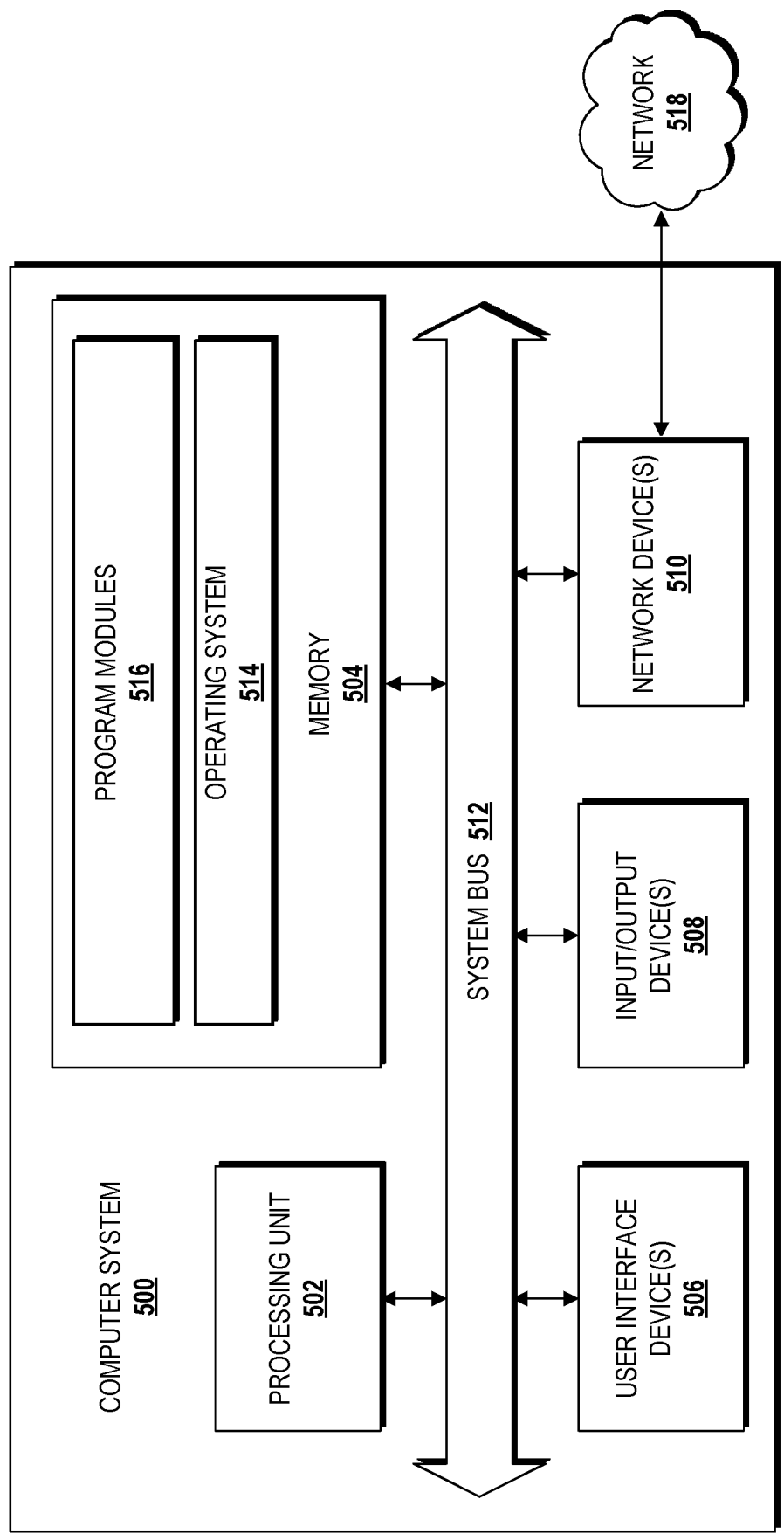
FIG. 5 is a block diagram illustrating an example computer system capable of implementing aspects of the embodiments presented herein.

FIG. 5 is a block diagram illustrating a computer system 500 configured to provide the functionality in accordance with various embodiments of the concepts and technologies disclosed herein. In some implementations, the hardware resource layer 158 (illustrated in FIG. 1) includes one or more computers that are configured like the architecture of the computer system 500. The computer system 500 may provide at least a portion of the compute resources 160, the memory resources 162, and/or the other resources 164. It should be understood, however, that modification to the architecture may be made to facilitate certain interactions among elements described herein.

The computer system 500 includes a processing unit 502, a memory 504, one or more user interface devices 505, one or more input/output ("I/O") devices 508, and one or more network devices 510, each of which is operatively connected to a system bus 512. The bus 512 enables bi-directional communication between the processing unit 502, the memory 504, the user interface devices 505, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein. The compute resources 160 (illustrated in FIG. 1) can include one or more processing units 502.

The memory 504 communicates with the processing unit 502 via the system bus 512. In some embodiments, the memory 504 is operatively connected to a memory controller (not shown) that enables communication with the processing unit 502 via the system bus 512. The memory resources 162 (illustrated in FIG. 1) can include one or more instances of the memory 504. The illustrated memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 516 may include various software and/or program modules to perform the various operations described herein. The program modules 516 and/or other programs can be embodied in computer-readable media containing instructions that, when executed by the processing unit 502, perform various operations such as those described herein. According to embodiments, the program modules 516 may be embodied in hardware, software, firmware, or any combination thereof.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, PDAs, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer. In some embodiments, the I/O devices 508 can be used for manual controls for operations to exercise under certain emergency situations.

The network devices 510 enable the computer system 500 to communicate with other networks or remote systems via a network 518. Examples of the network devices 510 include, but are not limited to, a modem, a radio frequency ("RF") or infrared ("IR") transceiver, a telephonic interface, a bridge, a router, or a network card. The network 518 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 518 may be or may include a wired network such as, but not limited to, a Wide Area Network ("WAN"), a wired Personal Area Network ("PAN"), or a wired Metropolitan Area Network ("MAN").

Based on the foregoing, it should be appreciated that concepts and technologies directed to master service orchestration of VNFs have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
receiving, by an instance of a distributed master service orchestrator system executing on at least a portion of a plurality of hardware resources of a network functions virtualization platform, from a user equipment, via a radio access network service controller of a plurality of service controllers, a service request that specifies a service to be provided to the user equipment by the network functions virtualization platform, wherein the plurality of service controllers correspond to a plurality of virtual networking function resource pools comprising a virtual mobility management entity pool, wherein each of the plurality of virtual networking function resource pools comprises virtual networking function resources executing on at least a further portion of the plurality of hardware resources for providing a specific network function, wherein the plurality of service controllers comprises the radio access network service controller that maintains a topology of a radio access network, and wherein the plurality of service controllers further comprises a mobility management entity service controller that instantiates and manages a virtual mobility management entity in the virtual mobility management entity pool of the plurality of virtual networking function resource pools; and instructing, by the instance of the distributed master service orchestrator system, a service controller of the plurality of service controllers to perform a service controller-specific operation to provide, at least in part, the service to the user equipment.

2. The method of claim 1, wherein instructing, by the distributed master service orchestrator system, the service controller of the plurality of service controllers to perform the service controller-specific operation to provide, at least in part, the service to the user equipment comprises instructing, by the distributed master service orchestrator system, the mobility management entity service controller to instantiate and manage the virtual mobility management entity to provide, at least in part, the service to the user equipment.

3. The method of claim 1, wherein instructing, by the distributed master service orchestrator system, the service controller of the plurality of service controllers to perform the service controller-specific operation to provide, at least in part, the service to the user equipment comprises instructing, by the distributed master service orchestrator system, a diameter routing agent service controller to instantiate and manage a virtual diameter routing agent to provide, at least in part, the service to the user equipment.

4. The method of claim 3, further comprising instructing, by the distributed master service orchestrator system, a home subscriber server service controller to instantiate and manage a virtual home subscriber server to provide, at least in part, the service to the user equipment.

5. The method of claim 1, wherein instructing, by the distributed master service orchestrator system, the service controller of the plurality of service controllers to perform the service controller-specific operation to provide, at least in part, the service to the user equipment comprises instructing, by the distributed master service orchestrator system, a serving gateway service controller to instantiate and manage a virtual serving gateway to provide, at least in part, the service to the user equipment.

6. The method of claim 5, further comprising instructing, by the distributed master service orchestrator system, a packet data network gateway service controller to instantiate and manage a virtual packet data network gateway to provide, at least in part, the service to the user equipment.

7. The method of claim 1, wherein instructing, by the distributed master service orchestrator system, the service controller of the plurality of service controllers to perform the service controller-specific operation to provide, at least in part, the service to the user equipment comprises instructing, by the distributed master service orchestrator system, a policy charging and rules function service controller to instantiate and manage a virtual policy charging and rules function to provide, at least in part, the service to the user equipment.

8. A computer-readable storage medium having instructions of a distributed master service orchestrator system stored thereon that, when executed by a processor of a network functions virtualization platform, cause an instance of the distributed master service orchestrator system to perform operations comprising:

receiving, from a user equipment, via a radio access network service controller of a plurality of service controllers, a service request that specifies a service to be provided to the user equipment by the network functions virtualization platform, wherein the plurality of service controllers correspond to a plurality of virtual networking function resource pools comprising a virtual mobility management entity pool, wherein each of the plurality of virtual networking function resource pools comprises virtual networking function resources executing on at least a portion of a plurality of hardware resources for providing a specific network function, wherein the plurality of service controllers comprises the radio access network service controller that maintains a topology of a radio access network, and wherein the plurality of service controllers further comprises a mobility management entity service controller that instantiates and manages a virtual mobility management entity in the virtual mobility management entity pool of the plurality of virtual networking function resource pools; and instructing a service controller of the plurality of service controllers to perform a service controller-specific operation to provide, at least in part, the service to the user equipment.

9. The computer-readable storage medium of claim 8, wherein instructing the service controller of the plurality of service controllers to perform the service controller-specific operation to provide, at least in part, the service to the user equipment comprises instructing the mobility management entity service controller to instantiate and manage the virtual mobility management entity to provide, at least in part, the service to the user equipment.

10. The computer-readable storage medium of claim 8, wherein instructing the service controller of the plurality of service controllers to perform the service controller specific operation to provide, at least in part, the service to the user equipment comprises instructing a diameter routing agent service controller to instantiate and manage a virtual diameter routing agent to provide, at least in part, the service to the user equipment.

11. The computer-readable storage medium of claim 10, wherein the operations further comprise instructing a home subscriber server service controller to instantiate and manage a virtual home subscriber server to provide, at least in part, the service to the user equipment.

12. The computer-readable storage medium of claim 8, wherein instructing the service controller of the plurality of service controllers to perform the service controller-specific operation to provide, at least in part, the service to the user equipment comprises instructing a serving gateway service controller to instantiate and manage a virtual serving gateway to provide, at least in part, the service to the user equipment.

13. The computer-readable storage medium of claim 12, wherein the operations further comprise instructing a packet data network gateway service controller to instantiate and manage a virtual packet data network gateway to provide, at least in part, the service to the user equipment.

14. The computer-readable storage medium of claim 8, wherein instructing the service controller of the plurality of service controllers to perform the service controller-specific operation to provide, at least in part, the service to the user equipment comprises instructing a policy charging and rules function service controller to instantiate and manage a virtual policy charging and rules function to provide, at least in part, the service to the user equipment.

15. A distributed master service orchestrator system comprising:

a plurality of master service orchestrator instances, wherein a master service orchestrator instance of the plurality of master service orchestrator instances comprises a processor of a network functions virtualization platform, and a memory comprising instructions that, when executed by the processor of the network functions virtualization platform, cause the master service orchestrator instance to perform operations comprising receiving, from a user equipment, via a radio access network service controller of a plurality of service controllers, a service request that specifies a service to be provided to the user equipment by the network functions virtualization platform, wherein the plurality of service controllers correspond to a plurality of virtual networking function resource pools comprising a virtual mobility management entity pool, wherein each of the plurality of virtual networking function resource pools comprises virtual networking function resources executing on at least a portion of a plurality of hardware resources for providing a specific network function, wherein the plurality of service controllers comprises the radio access network service controller that maintains a topology of a radio access network, and wherein the plurality of service controllers further comprises a mobility management entity service controller that instantiates and manages a virtual mobility management entity in the virtual mobility management entity pool of the plurality of virtual networking function resource pools; and instructing a service controller of the plurality of service controllers to perform a service controller-specific operation to provide, at least in part, the service to the user equipment.

16. The distributed master service orchestrator system of claim 15, wherein instructing the service controller of the plurality of service controllers to perform the service controller-specific operation to provide, at least in part, the service to the user equipment comprises instructing the mobility management entity service controller to instantiate and manage the virtual mobility management entity to provide, at least in part, the service to the user equipment.

17. The distributed master service orchestrator system of claim 15, wherein instructing the service controller of the plurality of service controllers to perform the service controller-specific operation to provide, at least in part, the service to the user equipment comprises instructing a diameter routing agent service controller to instantiate and manage a virtual diameter routing agent to provide, at least in part, the service to the user equipment.

18. The distributed master service orchestrator system of claim 17, wherein the operations further comprise instructing a home subscriber server service controller to instantiate and manage a virtual home subscriber server to provide, at least in part, the service to the user equipment.

19. The distributed master service orchestrator system of claim 15, wherein instructing the service controller of the plurality of service controllers to perform the service controller-specific operation to provide, at least in part, the service to the user equipment comprises instructing a serving gateway service controller to instantiate and manage a virtual serving gateway to provide, at least in part, the service to the user equipment; and wherein the operations further comprise instructing a packet data network gateway service controller to instantiate and manage a virtual packet data network gateway to provide, at least in part, the service to the user equipment.

20. The distributed master service orchestrator system of claim 15, wherein instructing the service controller of the plurality of service controllers to perform the service controller-specific operation to provide, at least in part, the service to the user equipment comprises instructing a policy charging and rules function service controller to instantiate and manage a virtual policy charging and rules function to provide, at least in part, the service to the user equipment.

* * * * *